US006890261B2

(12) United States Patent
Nagase

(10) Patent No.: US 6,890,261 B2
(45) Date of Patent: May 10, 2005

(54) GAME SYSTEM, PROGRAM AND IMAGE GENERATION METHOD

(75) Inventor: Jun Nagase, Yokohama (JP)

(73) Assignee: Namco Ltd., Tokyo (JP)

( * ) Notice: Subject to any disclaimer, the term of this patent is extended or adjusted under 35 U.S.C. 154(b) by 220 days.

(21) Appl. No.: 09/958,912

(22) PCT Filed: Feb. 1, 2001

(86) PCT No.: PCT/JP01/00703

§ 371 (c)(1),
(2), (4) Date: Oct. 25, 2001

(65) Prior Publication Data

US 2003/0100366 A1 May 29, 2003

(30) Foreign Application Priority Data

Feb. 17, 2000 (JP) ........................................ 2000-039849

(51) Int. Cl.$^7$ .............................................. A63F 13/00
(52) U.S. Cl. ...................................................... 463/31
(58) Field of Search ...................... 463/30–34; 343/418, 343/419, 426, 467, 469.1, 470, 582

(56) References Cited

U.S. PATENT DOCUMENTS

| | | | | | |
|---|---|---|---|---|---|
| 5,255,352 A | * | 10/1993 | Falk | ............................ | 345/582 |
| 5,706,418 A | * | 1/1998 | Uchiyama | .................... | 345/582 |
| 5,847,712 A | * | 12/1998 | Salesin et al. | ............... | 345/582 |

(Continued)

FOREIGN PATENT DOCUMENTS

| | | |
|---|---|---|
| JP | A 5-143711 | 6/1993 |
| JP | A 5-197818 | 8/1993 |
| JP | A 7-85310 | 3/1995 |

(Continued)

OTHER PUBLICATIONS

Power Animator, This Is Wonderful! Power of Expression of Contour Lines is the Best, May 1998, Nikkei Computer Graphics.*
Translation of JP 8–106549–A, Apr. 1996, Hirabayashi et al.*
CG, 1 998 5 8, BP No. 140, p. 127.
Stuart Green, "Non–photorealistic rendering", SIGGRAPH 99 Course Notes, 1999, ACM SIGGRAPH, p. 10–3–10–5 (http://www.cs.utah.edu/npr/papers/npr_course_Sig99.pdf).
L. Markosian, M. Kowalski, S. Trychin, and J. Hughes "Real–Time NonPhotorealistic Rendering", SIGGRAPH 97 conference Proceedings, Aug. 1997, ACM Siggraph, p. 4 (5.Rendering visible lines and surfaces;http://citeseer.nj.nec.com/papers/cs/2052/ftp:%23@S@%23%23@S@%23ftp.cs brown edu%23@S @%23pub%23@S@%23papers%23 @S@%23graphics%23@S@%23research%23@S@%23sig97–npr.pdf).

(Continued)

Primary Examiner—Michael O'Neill
(74) Attorney, Agent, or Firm—Oliff & Berridge, PLC

(57) ABSTRACT

A game system, program and image generating method for drawing an object viewed from various angles are provided. The thickness of an outline image of the object is changed depending on the face shape of the object. The outline image is drawn with a thicker outline when an angle θ between a first vector extending from a point on the face toward the viewpoint and a normal vector changes from the right angle with a lower decrement, and drawn with a thinner outline line when the angle θ changes from the right angle with a higher decrement. The outline image is drawn in the vicinity of an area defined by α≦θ≦90°. An outline texture specified by a texture coordinate, determined based on the inner product between the first vector and the normal vector, is mapped on the object. Another outline image, having constant thickness, is drawn.

12 Claims, 18 Drawing Sheets

U.S. PATENT DOCUMENTS

| | | | | |
|---|---|---|---|---|
| 5,870,107 A | * | 2/1999 | Fujisawa et al. | 345/467 |
| 5,959,634 A | * | 9/1999 | Yoshida | 345/467 |
| 5,966,134 A | | 10/1999 | Arias | |
| 6,130,667 A | * | 10/2000 | Hasegawa et al. | 345/467 |
| 6,283,861 B1 | * | 9/2001 | Kawai et al. | 463/43 |
| 6,331,856 B1 | | 12/2001 | Van Hook et al. | |

FOREIGN PATENT DOCUMENTS

| | | |
|---|---|---|
| JP | A 8-106549 | 4/1996 |
| JP | A 8-315182 | 11/1996 |
| JP | A 9-325759 | 12/1997 |
| JP | A 11-339064 | 12/1999 |

OTHER PUBLICATIONS

Gooch, Amy, Bruce Gooch, Peter Shirley, and Elaine Cohen "A non–photorealistic lighting model for automatic technical illustration", SIGGRAPH 98 Conference Proceedings, Jul. 1998 A CM Siggraph (http://www.cs.utah.edu/gooch/SIG98/gooch 98.pdf).

* cited by examiner

GAME SYSTEM, PROGRAM AND IMAGE GENERATION METHOD

TECHNICAL FIELD

The present invention relates to a game system, program and image generating method.

BACKGROUND OF ART

In the prior art, there is known a game system which can generate an image viewable from a given viewpoint in an object space that is a virtual three-dimensional space. Such a game system is very popular as a system which can realize a so-called virtual reality. If the game system is used to enjoy a roll-playing game, a player can enjoy the game by controlling a character (or object) to move on a map within the object space such that the character will fight against an enemy character, dialogue with another character and visit various cities.

In the game system, an object representing a character or the like is usually formed by a plurality of polygons (or primitive surfaces). The object (or model) formed by the polygons is arranged within the object space and subjected to the geometry processing (or three-dimension computation) for generating an image viewable from a virtual camera (or viewpoint). This enables a consistent game image to be generated even when this object is viewed through the virtual camera in various directions.

However, the game image so generated is mathematically correct, but cannot sufficiently hit the feeling of the player.

For example, the outline (edge line) of the object formed by the polygons is always formed by a line having its invariable thickness without dependence on the shape of the object, the direction in which the object is viewed and so on. If a character in an animated cartoon is to be represented by the object formed by the polygons, therefore, the image thereof having an atmosphere unfamiliar to the general public will be generated since it has a monotonous outline.

DISCLOSURE OF INVENTION

An objective of the present invention is therefore to provide a game system, program and image generating method which can give a varied line thickness of outline to an object that may be viewed from various directions.

To this end, the present invention provides a game system which generates an image, comprising: outline drawing means which draws an outline image of an object so that a thickness of the outline image varies depending on a face shape of the object in a vicinity of an outline of the object; and means which generates an image viewed from a given viewpoint within an object space in which the object is positioned. The present invention also provides a computer-usable information storage medium comprising a program for a computer to realize the above-described means. The present invention further provides a computer-usable program (including a program embodied in a carrier wave) comprising a processing routine for a computer to realize the above-described means.

According to the present invention, the thickness of the outline image will vary depending on the face shape (such as face gradient, rate of gradient change, and curvature) of the object in the vicinity of the outline thereof. As the object is viewed from a different direction or as the object is moved or rotated to change the outline position thereof displayed on a screen, the outline image can be displayed with its thickness depending on the shape of the object in the vicinity of its outline. As a result, the thickness of the outline can be changed in the object which may be viewed from various directions. This provides the image of an object which is generated optimally for the animation games and cartoon games.

In the game system, information storage medium and program according to the present invention, the outline drawing means may draw a thicker outline image of the object for a face shape in which an angle between a first vector extending from a point on an object face toward a viewpoint and a normal vector indicating an orientation of a face of the object varies from a right angle with a lower decrement, and a thinner outline image of the object for a face shape in which the angle varies from the right angle with a higher decrement.

Thus, the thicker outline image will be drawn when the object face more gently varies in an area in the vicinity of the outline while the thinner outline image will be drawn for abrupt variations of the object face. This enables the outline of the object to be given variations of thickness.

The point on the object face may be a point on a curved face or a vertex (or definition point) in a polygon. The normal vector indicating the orientation of face maybe a normal vector set on an object face or on a vertex (or definition point) thereof.

In the game system, information storage medium and program according to the present invention, the outline drawing means may draw the outline image in a vicinity of an area in which the angle between the first vector and the normal vector is equal to or larger than a given angle, and equal to or smaller than the right angle.

Thus, the thickness of the outline image can be controlled merely by checking the angle between the first vector and the normal vector.

The area in which the angle in equal to or larger than the given angle, but equal to or smaller than the right angle may be specified using the angle between the first vector and the normal vector or the inner product between the first vector and the normal vector. Moreover, the area does not necessarily coincide with the outline area in which the outline image is drawn.

The present invention further provides a game system which generates an image, comprising: means which determines a texture coordinate used to specify an outline texture based on a first vector extending from a point on an object face toward a viewpoint and a normal vector indicating an orientation of an object face; means which maps an outline texture specified by the determined texture coordinate on the object; and means which generates an image viewed from the viewpoint within an object space in which the object is positioned. The present invention further provides a computer-usable information storage medium comprising a program for a computer to realize the above-described means. The present invention further provides a computer-usable program (including a program embodied in a carrier wave) comprising a processing routine for a computer to realize the above-described means.

According to the present invention, the outline image is drawn by mapping the outline texture (which is a texture used to draw the outline image) specified by the texture coordinates which are determined based on the first vector and the normal vector onto the object. Thus, the texture coordinates specifying the outline texture will be varied depending on the angle (or inner product) between the first vector and the normal vector. The outline image corresponding to the angle will be drawn in the vicinity of the outline of the object. Therefore, the thickness of the outline image will be varied depending on the outline position of the object displayed on the screen, which is changed when the direction in which the object is viewed is changed or when the object is moved or rotated. As a result, a so-called handwritten type image having its varied line thickness of outline can be generated.

In the game system, information storage medium and program according to the present invention, the texture coordinate used to specify the outline texture may be determined from an inner product between a first vector extending from a vertex of the object toward the viewpoint and a normal vector set at the vertex of the object.

Thus, the thickness of the outline image can be varied through a simpler and less loaded processing in which the inner product between the first vector and the normal vector is only determined.

In the image generating system, information storage medium and program according to the present invention, the outline texture may have a first texture pattern for representing the outline image and a second texture pattern different from the first texture pattern, and the first texture pattern may be specified when the texture coordinate is between a first value and a second value, and the second texture pattern may be specified when the texture coordinate is between the second value and a third value.

Thus, such a situation where the outline image will be drawn by unit of the primitive surface (or polygon or freeform curved surface) can be avoided.

The first value may be texture coordinates when the angle between the first vector and the normal vector is 90 degrees, for example. The third value may be texture coordinates when the angle between the first vector and the normal vector is zero degree, for example. The second value may be used to control the average thickness in the outline image.

The game system, information storage medium and program according to the present invention, may further comprise means which draws another outline image having a constant thickness (or a program or processing routine for a computer to realize the above-described means).

Thus, the outline image having its thickness equal to or larger than one pixel will always be drawn on the outline of the object. This prevents the outline of the object from being broken.

The present invention further provides a game system which generates an image, comprising: means which judges whether a polygon forming an object is front-facing or back-facing as viewed from a viewpoint; means which judges whether normal vectors set at adjacent vertexes in a polygon are front-facing or back-facing as viewed from the viewpoint when the polygon is judged as front-facing, and draws an outline image between adjacent vertexes at which normal vectors are set respectively when both normal vectors are judged as back-facing; and means which judges whether normal vectors set at adjacent vertexes in a polygon are front-facing or back-facing as viewed from the viewpoint when the polygon is judged as back-facing, and draws an outline image between adjacent vertexes at which normal vectors are set respectively when both normal vectors are judged as front-facing. The present invention further provides a computer-usable information storage medium comprising a program for a computer to realize the above-described means. The present invention further provides a computer-usable program (including a program embodied in a carrier wave) comprising a processing routine for a computer to realize the above-described means.

According to the present invention, the outline image is drawn between the adjacent vertexes at which the back-facing normal vectors are set when the polygon is front-facing while the outline image is drawn between the adjacent vertexes at which the front-facing normal vectors are set when the polygon is back-facing. Therefore, the outline image can be drawn on the outline of the object through a simplified processing in which the judgment is only carried out relating to whether the polygon and normal vertex vectors are front-facing or back-facing.

BEST FORM FOR CARRYING OUT THE INVENTION

A preferred embodiment of the present invention will now be described with reference to the drawings.

1. Configuration

Figure 1:
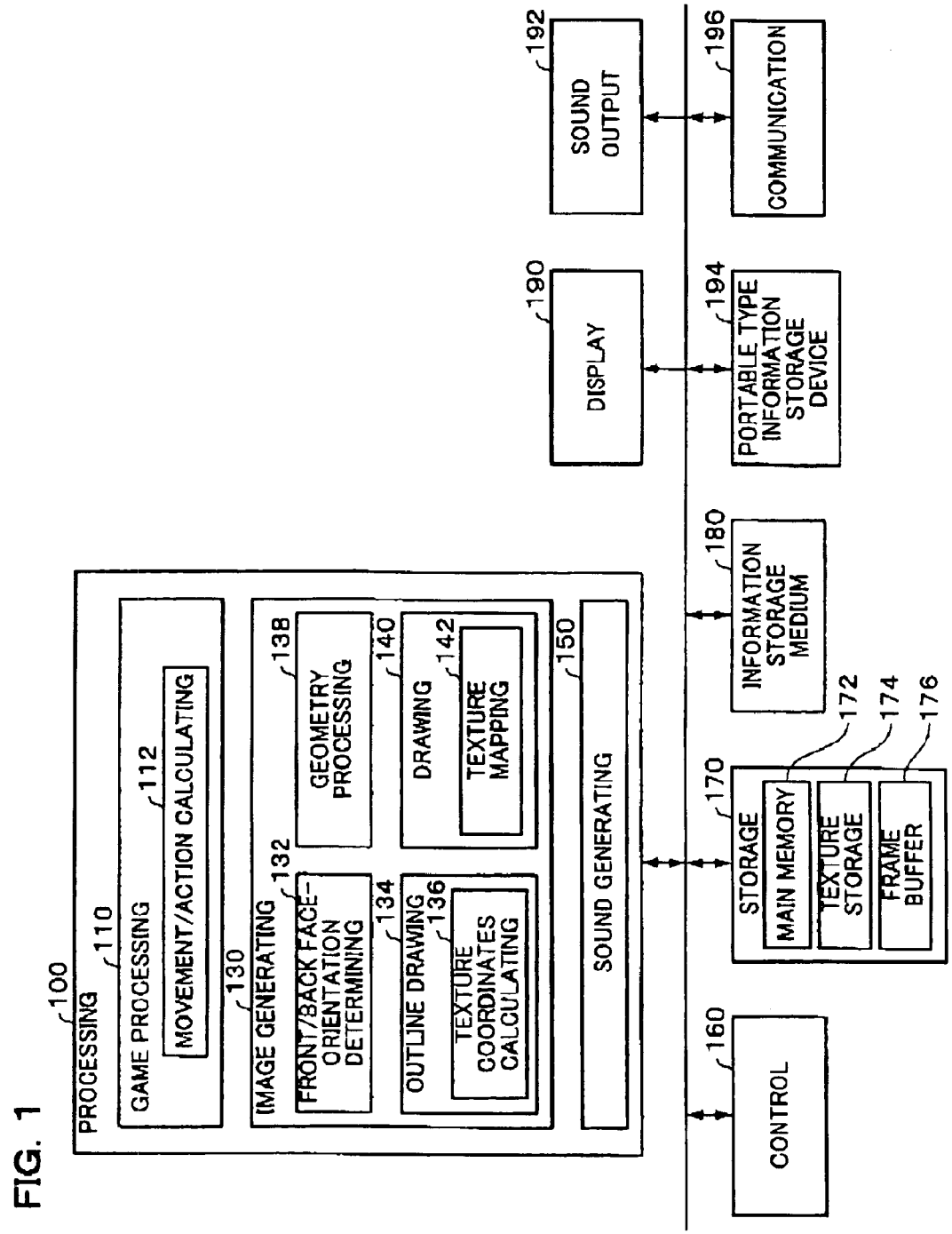
FIG. 1 is a block diagram of a game system constructed in accordance with this embodiment.

FIG. 1 shows a block diagram of a game system (or image generating system) according to this embodiment. In this figure, this embodiment may comprise at least a processing section 100 (or a processing section 100 with a storage section 170 or a processing section 100 with a storage section 170 and an information storage medium 180) Each of the other blocks (e.g., control section 160, display section 190, sound output section 192, portable type information storage device 194 and communication section 196) may take any suitable form.

The processing section 100 is designed to perform various processings for control of the entire system, commands to the respective blocks in the system, game processing, image processing, sound processing and so on. The function thereof may be realized through any suitable hardware means such as various processors (CPU, DSP and so on) or ASIC (gate array or the like) or a given program (or game program).

The control section 160 is used to input operational data from the player and the function thereof may be realized through any suitable hardware means such as a lever, a button, a housing or the like.

The Storage section 170 provides a working area for the processing section 100, communication section 196 and others. The function thereof may be realized by any suitable hardware means such as RAM or the like.

The information storage medium (which may be a computer-usable storage medium) 180 is designed to store information including programs, data and others. The function thereof maybe realized through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 180 stores various pieces of information (programs or data) for realizing (or executing) the means of the present invention (or this embodiment) which are particularly represented by the blocks included in the processing section 100.

Part or the whole of the information stored in the information storage medium 150 will be transferred to the storage section 170 when the system is initially powered on. The information stored in the information storage medium 180 may contain at least one of program code set for processing the present invention, image data, sound data, shape data of objects to be displayed, table data, list data, information for instructing the processings in the present invention, information for performing the processings according to these instructions and so on.

The display section 190 is to output an image generated according to this embodiment and the function thereof can be realized by any suitable hardware means such as CRT, LCD or HMD (Head-Mount Display).

The sound output section 192 is to output a sound generated according to this embodiment and the function thereof can be realized by any suitable hardware means such as speaker.

The portable type information storage device 194 is to store the player's personal data and save data and may be take any suitable form such as memory card, portable game machine and so on.

The communication section 196 is designed to perform various controls for communication between the game system and any external device (e.g., host device or other image generating system). The function thereof may be realized through any suitable hardware means such as various types of processors or communication ASIS or according to any suitable program.

The program or data for realizing (or executing) the means in the present invention (or this embodiment) may be delivered from an information storage medium included in a host device (or server) to the information storage medium 180 through a network and the communication section 196. The use of such an information storage medium in the hose device (or server) falls within the scope of the invention.

The processing section 100 further comprises a game processing section 110, an image generating section 130 and a sound generating section 150.

The game processing section 110 is designed to perform various processings such as coin (or charge) reception, setting of various modes, game proceeding, setting of scene selection, determination of the position and rotation angle (about X-axis, Y-axis or Z-axis) of an object (one or more primitive surfaces), movement of the object (motion processing), determination of the view point (virtual camera's position) and view angle (rotational virtual camera angle), arrangement of the object within the object space, hit checking, computation of the game results (or scores), processing for causing a plurality of players to play in a common game space, various game computations including game-over and other processings, based on operational data from the control section 160 and according to the personal data, saved data and game program from the portable type information storage device 194.

The image generating section 130 is to perform various image processings according to the commands or the like from the game processing section 110. For example, the image generating section 130 may generate an image viewable from a virtual camera (or viewpoint) within an object space and output it toward the display section 190.

The sound generating section 150 is to perform various sound processings according to the commands and the like from the game processing section 110. The sound generating section 150 may generate sounds such as BGMs, sound effects or voices which are in turn outputted toward the sound output section 192.

All the functions of the game processing section 110, image generating 130 and sound generating section 150 may be realized by any suitable hardware means or according to the program. Alternatively, these functions maybe realized by both the hardware means and program.

The game processing section 110 further comprises a movement/action calculating section 112.

The movement/action calculating section 112 is to calculate the information of movement for objects (or models) such as characters and so on (positional and rotation angle data) and the information of action for the objects (positional and rotation angle data relating to the parts in the objects) For example, the movement/action calculating section 112 may cause the objects to move and act based on the operational data inputted by the player through the control section 160 and according to the game program.

More particularly, the movement/action calculating section 112 may determine the position and rotational angle of the object, for example, for each one frame (1/60 seconds). For example, it is now assumed that the position of the object for (k-1) frame is PMk-1, the velocity is VMk-1, the acceleration is Amk-1, time for one frame is Δt. Thus, the position PMk and velocity VMk of the object for k frame can be determined by the following formulas (1) and (2);

$$PMk = PMk\text{-}1 + VMk\text{-}1 \times \Delta t \quad (1)$$

$$VMk = VMk\text{-}1 + Amk\text{-}1 \times \Delta t \quad (2).$$

The image generating section 130 comprises a front/back face-orientation judging section 132, an outline calculating section 134, a geometry-processing section 138 and a drawing section 140.

The front/back face-orientation judging section 132 judges whether a polygon forming an object is front-facing or back-facing. Such a judgment may be accomplished, for example, by taking the outer product between two vectors connecting between vertexes in the polygon.

The outline image drawing section 134 draws the outline image of the object such that the thickness thereof will be changed depending on the face shape of the object in the vicinity of the outline thereof. For example, if the face shape of the object in the vicinity of the outline thereof gently changes, the outline image will be drawn with a thicker line in the vicinity of the outline of the object. If the face shape abruptly changes, the outline image will be drawn with a thinner line in the vicinity of the outline of the object.

More particularly, if the object includes a face of such a shape that an angle between a first vector extending from a point on the object's face (e.g., a vertex on the polygon or a point on the free-form curved surface) toward the viewpoint (or virtual camera) and a normal vector indicating the orientation of the object's face (e.g., a normal vector set at a vertex or face) changes from the right angle with a lower decrement, the outline image will be drawn with a thicker line. If the angle changes from the right angle with a higher decrement, the outline image will be drawn with a thinner line.

In such a manner, the outline of the object can be changed to generate an image in a handwriting (cell-animating) manner, even though the object informed by polygons or free-form curved surfaces.

If it is desired to realize the drawing of the outline image through the texture mapping, a texture coordinates calculating section 136 determines texture coordinates used to specify an outline texture, based on the first vector and the normal vector. A texture mapping section 142 included in the drawing section 140 uses this determined texture coordinates to read the outline texture from a texture storage section 174 of the storage section 170 and to map it onto an object (or primitive surface in the vicinity of the outline).

The outline image drawing section 134 also draws an outline having a constant thickness other than the aforementioned outline having its variable thickness on the object. Such a drawing process can be accomplished by drawing the outline image having its constant thickness between vertexes on the polygon, based on the judgment result in the front/back face-orientation judging section 132, the front/back face-orientation judgment relating to the normal vector and so on.

The geometry-processing section 138 performs various geometry-processings (or three-dimension computations) relative to the object, such as coordinate transformation, clipping, perspective transformation, light-source calculation and so on. Data relating to the geometry-processes (or perspective-transformed) object, such as object vertex coordinates, texture coordinates, color (brightness) data, normal vector data, alpha ($\alpha$) value and so on, is stored and saved in a main memory 172 of the storage section 170.

The drawing (or rendering) section 140 draws the geometry-processes (or perspective-transformed) object in a frame buffer 176. Thus, an image viewed from a given viewpoint (or virtual camera) within the object space in which the object is arranged will be generated.

The image generating system of the present invention may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission lien or communication line) may be used in the present invention.

2. Feature of this Embodiment 2.1 Enhancement of Outline

The first feature of this embodiment is that the thickness of the outline (edge line) image is changed depending on the face shape of the object in the vicinity of the outline thereof.

Figure 2:
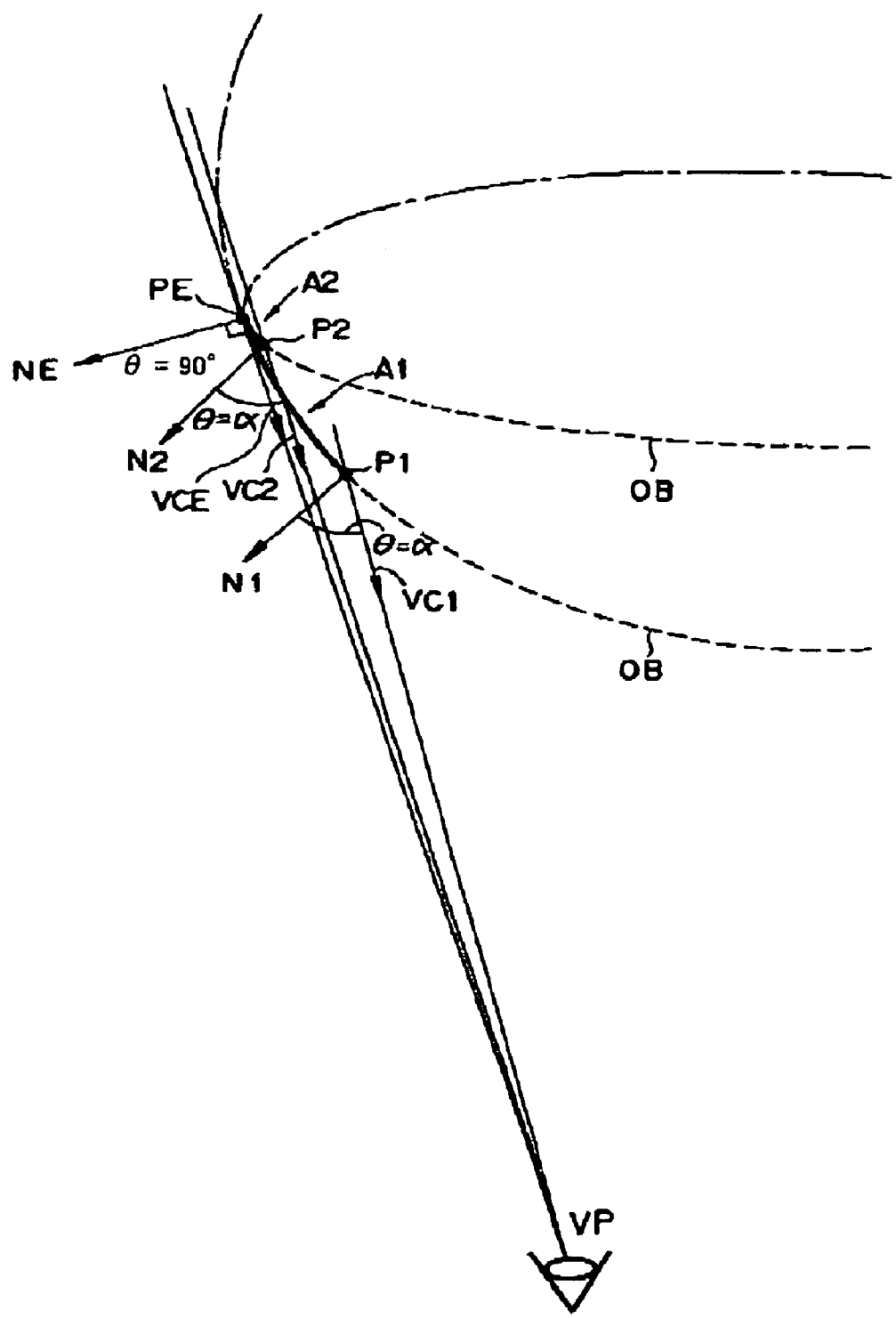
FIG. 2 illustrates a technique of changing the thickness of the outline image depending on the face shape of an object in the vicinity of its outline.

For example, as shown in FIG. 2, a thicken solid line represents an outline area (or an area in which the outline image is drawn); a dotted line represents a non-outline area (or a visible area in which the outline image is not drawn); and a one-dot chain line represents an invisible area (or an area to be hidden-surface erased).

In this embodiment, for example, the outline image may be thicken (or thinned) if the face of an object OB has such a shape as shown by A1 in FIG. 1. The outline image may be thinned (or thicken) if the face has such a shape as shown by A2 in FIG. 2.

Thus, the outline image of the object will be thicken or thinned as the object is viewed from a different direction or as the object is rotated or moved to change the outline position of the object on the screen. According to this embodiment, therefore, a handwritten type image having its varied line thickness of outline can be generated even if the object is formed by primitive surfaces such as polygons or free-form curved surfaces.

The control of the variable thickness of the outline image as shown in FIG. 2 may be attained by such a technique as described below.

It is assumed, for example, that an angle between each of first vectors (VC1, VC2 and VCE) extending from the corresponding one of points (P1, P2 and PR) on the face of the object OB toward the viewpoint VP and each of normal vectors (N1, N2 and NE) relative to the face of the object OB is $\theta$.

In this case, the outline image will be drawn with a thicken line for such a face shape as shown by A1 in FIG. 2 in which the angle $\theta$ changes from the right angle with a lower decrement (in a gentle manner). On the other hand, the outline image will be drawn with a thinned line for such a face shape as shown by A2 in FIG. 2 in which the angle $\theta$ changes from the right angle with a higher decrement (in an abrupt manner).

This can be accomplished by drawing the outline image (black-colored image) in the vicinity of an area in which the angle $\theta$ between each of first vectors (VC1, VC2 and VCE) extending from the corresponding one of the points (P1, P2 and PE) on the face of the object OD toward the viewpoint VP and each of the normal vectors (N1, N2 and NE) relative to the face of the object OB is between 90 degrees and a given angle $\alpha$.

However, it is not necessarily required that the outline area in which the outline image is drawn perfectly coincides with the area having the range of $\alpha \leq \theta \leq 90°$.

The point Pr shown in FIG. 2 is one that the angle $\theta$ between the first vector (VCE) and the normal vector (NE) is equal to 90 degrees and that is located on the outline position of the object OB. Thus, the point PE will be referred to the Outline point. The outline image is drawn between this outline point PE and the point P1 and between the outline point PE and the point P2.

The face in which the angle $\theta$ gently changes (A1 in FIG. 2) is one that the point P1 with the angle $\theta=\alpha$ is spaced farther apart from the outline point PE. The face in which the angle $\theta$ abruptly changes (A2 in FIG. 2) is one that the point P2 with the angle $\theta=\alpha$ is spaced nearer apart from the outline point PE.

2.2 Realization through Texture Mapping

If an object is formed by sufficiently small divided polygons and when the face thereof in the vicinity of the outline point can substantially approximate to a curved face, the outline image can substantially be drawn by unit of pixels merely by black-coloring the polygons in the outline area.

Figure 4:
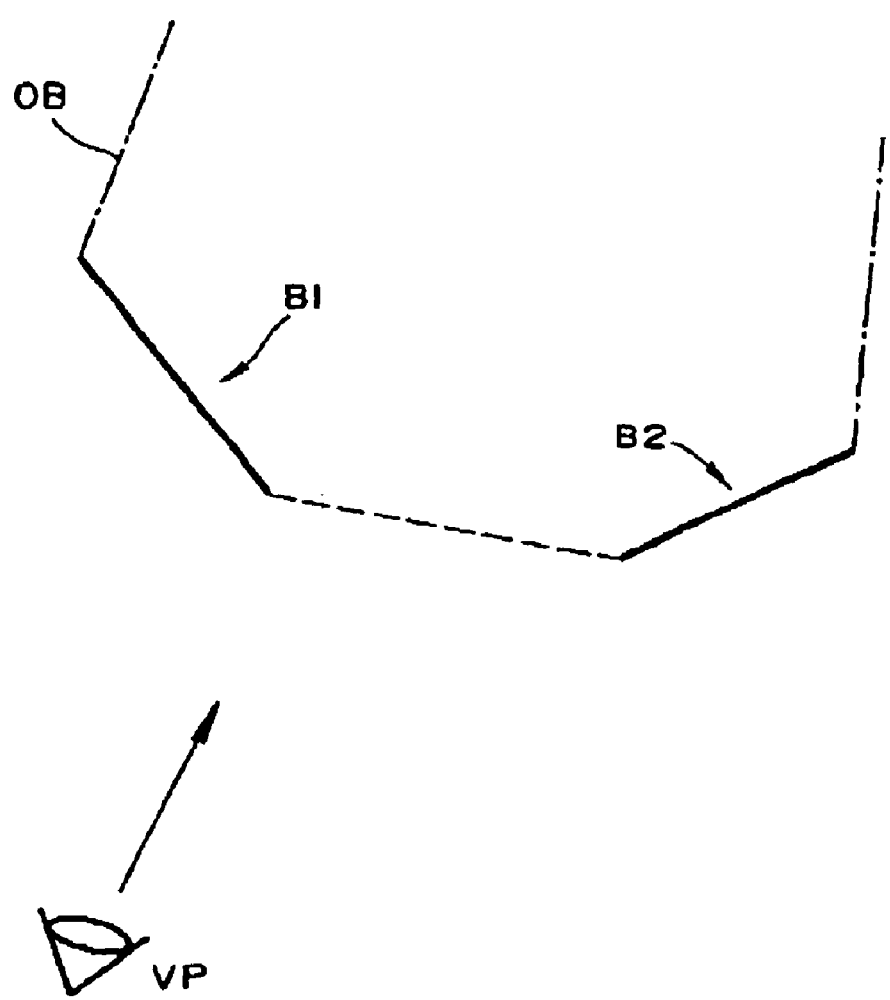
FIG. 4 illustrates a defect occurring when the outline image is drawn by polygon.

However, if the number of divided polygons in the object is smaller and when the object is drawn by such larger and rough polygons as shown in FIG. 4, the image will very unnaturally be drawn if the outline image thereof is drawn by such polygons as shown by B1 and B2 in FIG. 4. In FIG. 4, solid lines represent outline areas; a dotted line represents a non-outline area; and one-dot chain lines represent invisible areas.

Therefore, this embodiment provides an outline texture used to draw the outline image, the outline texture being mapped on the object.

Thus, the outline image can be realized by pixels without dependence on the size of polygon (or the number of divided polygons).

Figure 5:
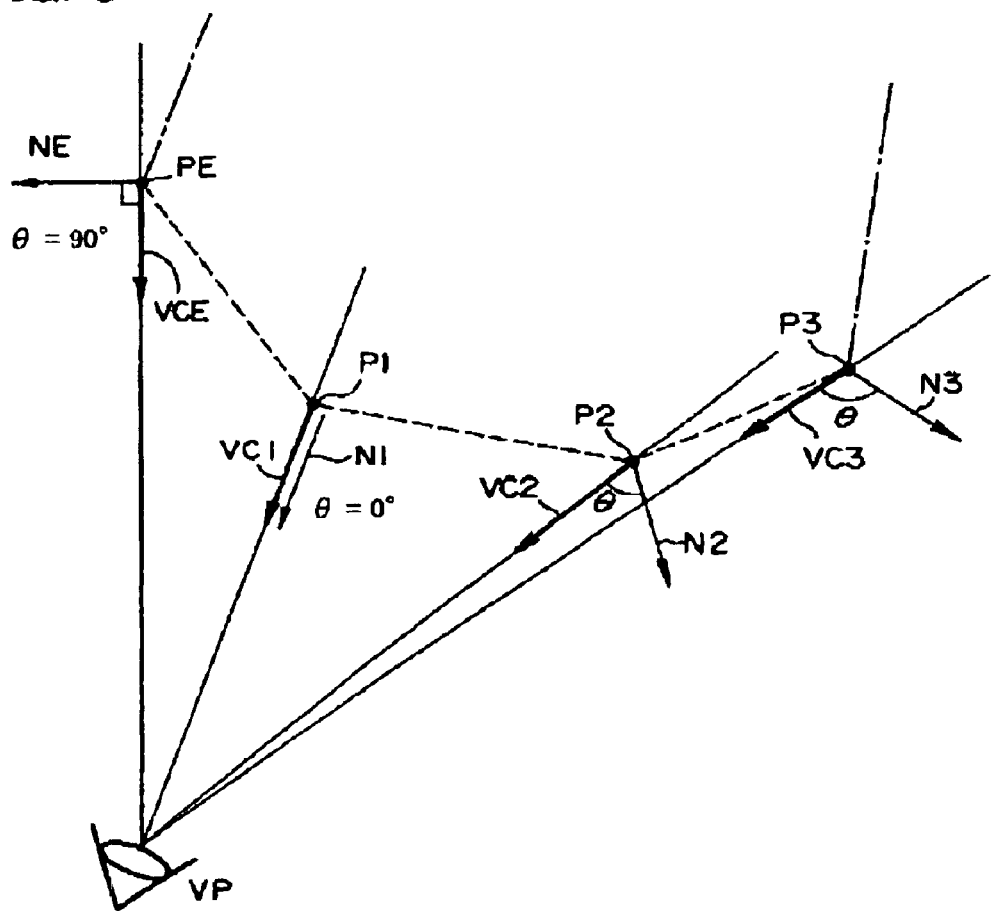
FIG. 5 illustrates a technique of drawing the outline image through mapping of an outline texture.

It is assumed, for example, that an angle between each of first vectors (VCE, VC1, VC2 and VC3) extending from the corresponding one of vertexes (PE, P1, P2 and P3) on the object toward the viewpoint VP and each of normal vectors (NE, N1, N2 and N3) set to the vertexes (PR, P1, P2 and P3) of the object is θ, as shown in FIG. 5.

In such a case, this embodiment determines the inner product between the first vector and the normal vector (cos θ if the first vector and the normal vector are unit vectors). This inner product is then set at texture coordinates V. Texture coordinates U is fixed at (0.0).

Figure 6:
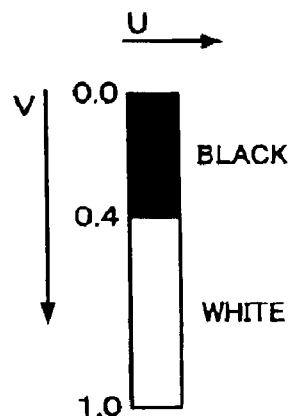
FIG. 6 shows an example of the outline textures.

In addition, for example, there may be provided an outline texture which has black-colored and white-colored texture patterns for representing the outline image, as shown in FIG. 6. The texture coordinates U and V determined by the inner product are then used to read the outline texture which is in turn mapped on the object.

Figure 7:
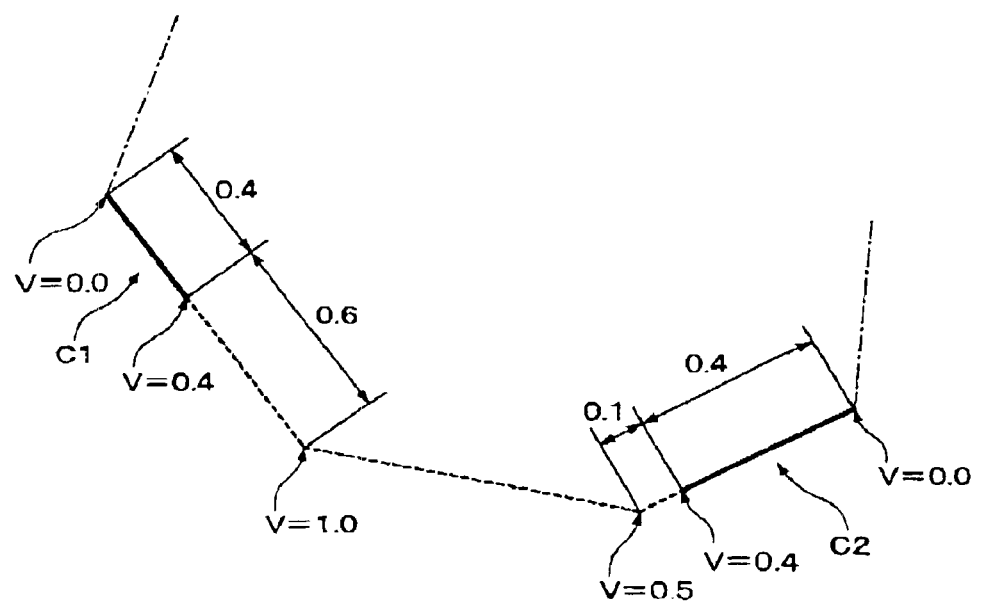
FIG. 7 illustrates another technique of drawing the outline image through mapping of an outline texture.

Thus, the outline areas (shown by solid lines) will be drawn with black color while the non-outline areas (shown by dotted lines) will be drawn with white color, as shown in FIG. 7. This prevents such a defect that the outline image will be drawn by unit of polygons.

In the outline texture of FIG. 6, the black color (or first texture pattern) is specified if the texture coordinates V ranges between 0.0 and 0.4 (wherein 0.0 is first value and 0.4 is second value). On the other hand, the white color (second texture pattern) is specified if the texture coordinates V ranges $0.4<V\leq1.0$ (wherein 1.0 is third value).

As a result, the black color (outline image) is drawn in the range of $0.0\leq V\leq0.4$ and the white color is drawn in the range of $0.4<V\leq1.0$, as shown by C1 and C2 in FIG. 7. In this connection, V=0.0 corresponds to θ=90°; V=0.4 corresponds to θ=60°; and V=1.0 corresponds to θ=0°.

In the actual object, however, a problem is raised in that the other texture has been mapped on the non-outline areas (shown by dotted lines in FIG. 7). Thus, the non-outline areas cannot be filled by white color.

To overcome such a problem, it is desirable that such an outline texture having color data CR, G and B) and alpha (ca)value as shown in FIG. 5A is used. The alpha value is additional information stored in association with each pixel, other than color information. The alpha value may be used as transparency which is equivalent to translucency or opacity.

Figure 8A:
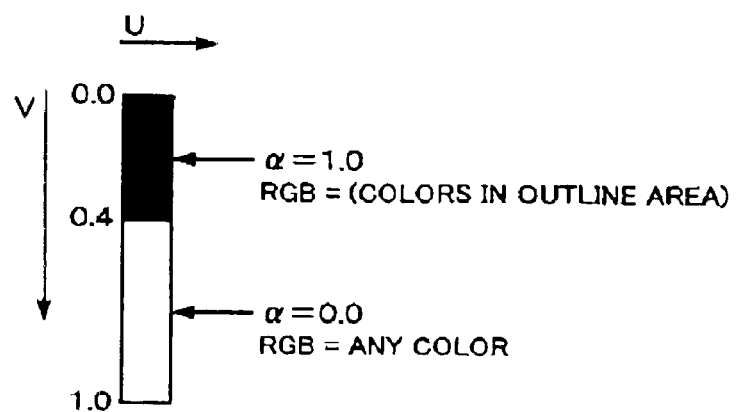
FIGS. 8A and 8B show the other outline textures.

Referring to FIG. 8A, the area of $0.0\leq V\leq0.4$ (or the first texture pattern area) is set at α=1.0 (opacity). Therefore, the outline area will be drawn with a color CR, a, B) specified by the outline texture.

On the other hand, the area of $0.4<V\leq1.0$ (or the second texture pattern area) is set at α=0.0 (transparency) Therefore, the original color (or the color of the underlying object) will be drawn as it is.

Although the use of such an alpha value leads to a defect that the capacity of the texture increases, it also provides an advantage in that the outline area can be drawn by any desired color.

Figure 8B:
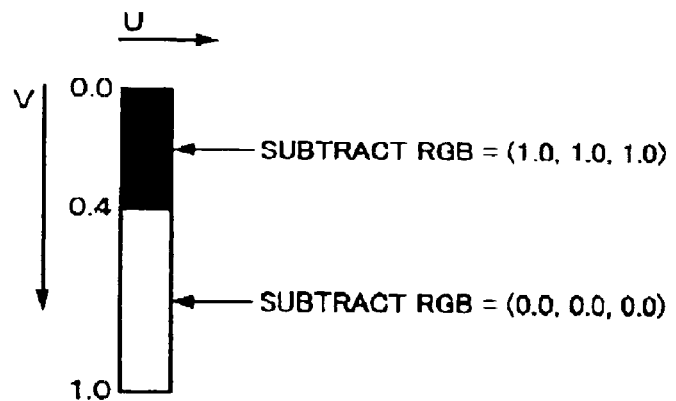

If the alpha value cannot be used, such an outline texture as shown in FIG. 8B may be used.

In the texture of FIG. 8B, the color thereof is subtracted from the original color. Since each of the original color components R, G and B is subtracted by 1.0 in the outline area, the outline area is necessarily drawn with black color independently of the original color (where the value less than 0.0 is considered to be equal to 0.0). On the other hand, each of the original color components R, G and B is subtracted by 0.0 in the non-outline area. Therefore, the non-outline area will be drawn with the original color without any change.

Figure 9:
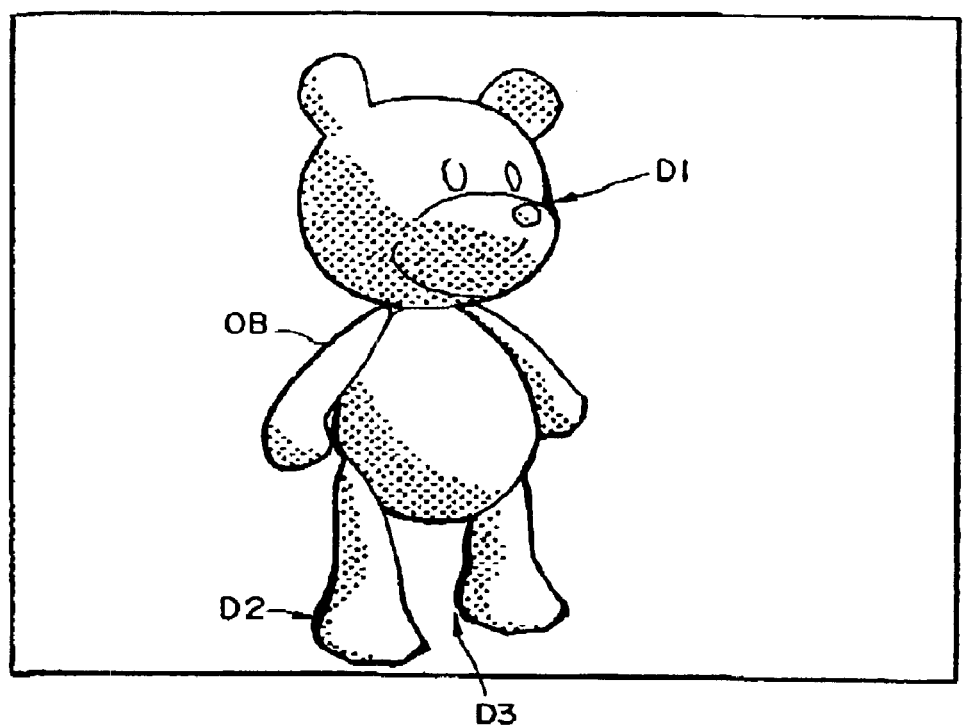
FIG. 9 shows a game image generated according to this embodiment.

FIG. 9 shows a game image generated according to this embodiment.

As shown by D1, D2 and D3 in FIG. 9, this embodiment provides different thickness in the outline image of the object OB (bear) depending on the place.

Figure 10:
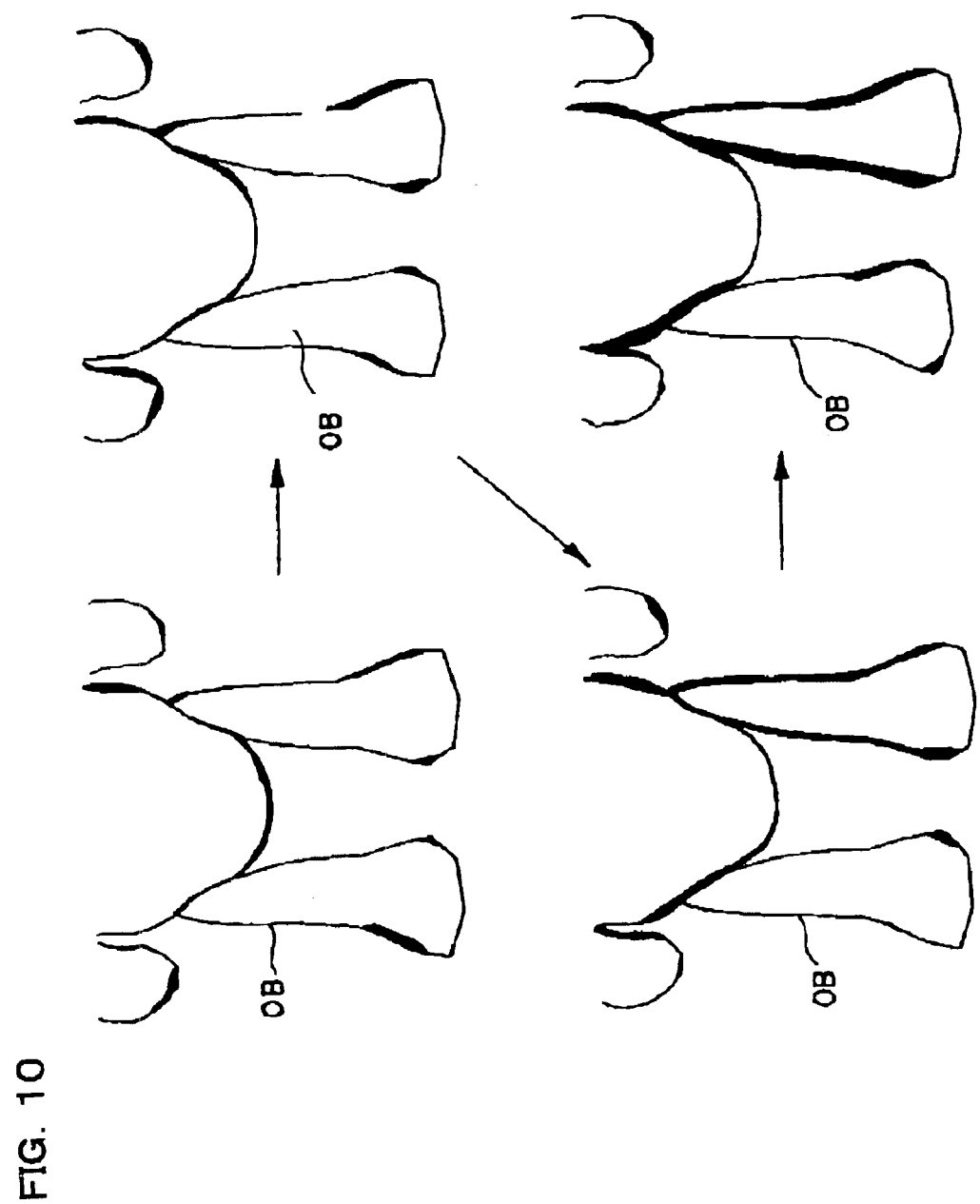
FIG. 10 illustrates a manner in which the thickness of the outline image is changed depending on the direction in which the object is viewed.

According to this embodiment, the thickness of the outline image in the object OB will be changed depending on the direction in which the object OB is viewed or the like, as shown in FIG. 10.

In such a manner, a handwritten type image having its varied line thickness of outline can be represented to provide a game image which more hits the feeling of the general public who likes the animation and cartoon.

2.3 Addition of Outline Image Having Constant Thickness

If an object is formed by roughly divided polygons, there may occur a by-product which would never be created when the object is formed by curved faces or sufficiently small divided polygons. Namely, the thickness of the outline image will abruptly be changed as the relative position between the object and the viewpoint or the relative angle between the object and the sight line is changed.

Figure 11A:
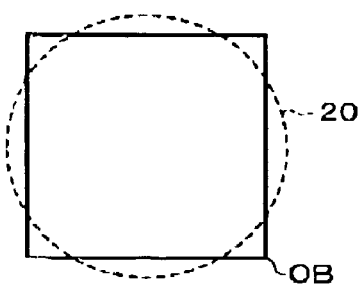
FIGS. 11A and 11B show several objects which are formed by roughly divided polygons.
Figure 11B:
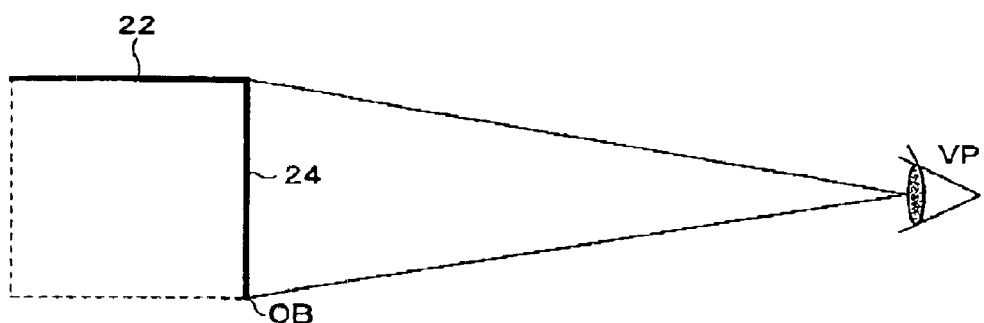

It is considered, for example, that a cylindrical matter 20 of FIG. 11A is modeled by a square pole-like object OB formed by roughly divided polygons. Moreover, the change in thickness of the outline will be described by FIG. 11B in connection with faces 22 and 24 in the square pole-like object OB. It is now assumed that the outline texture is one that is used to draw the outline image when the texture coordinates are $0.0\leq V\leq0.4$ (see FIGS. 8A and 8B).

Figure 12A:
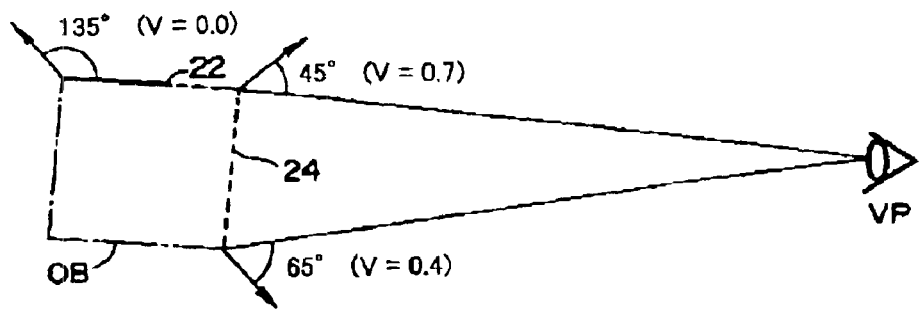
FIGS. 12A, 12B and 12C illustrate a manner in which the thickness of the outline image is abruptly changed.

FIG. 12A shows a moment whereat the face 22 begins to be viewed from the viewpoint VP. At this step, the outline images (or outline areas) in both the faces 22 and 24 are not drawn or invisible as viewed from the viewpoint VP.

Figure 13A:
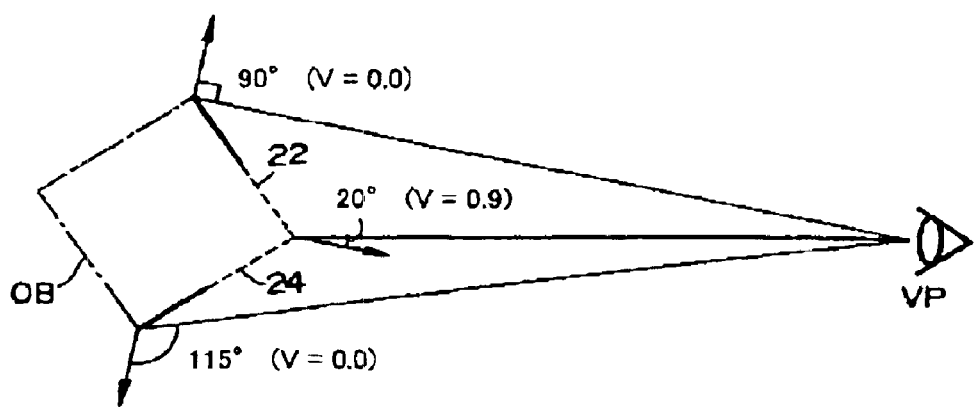
FIGS. 13A and 13B also illustrate another manner in which the thickness of the outline image is abruptly changed.

The outline image of the face 22 is gradually thicken from FIG. 12A toward FIG. 13A and has its maximum thickness in FIG. 13A, as viewed from the viewpoint VP. The outline image is abruptly thinned from FIG. 13A toward FIG. 13B and will not be drawn in FIG. 13B.

Figure 12B:
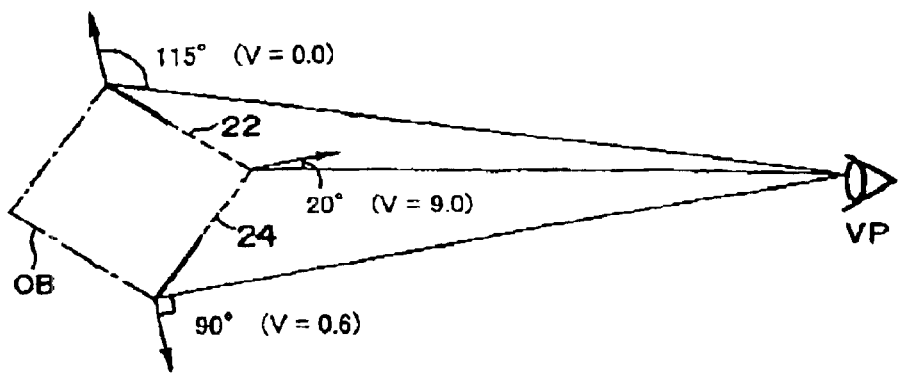
Figure 12C:
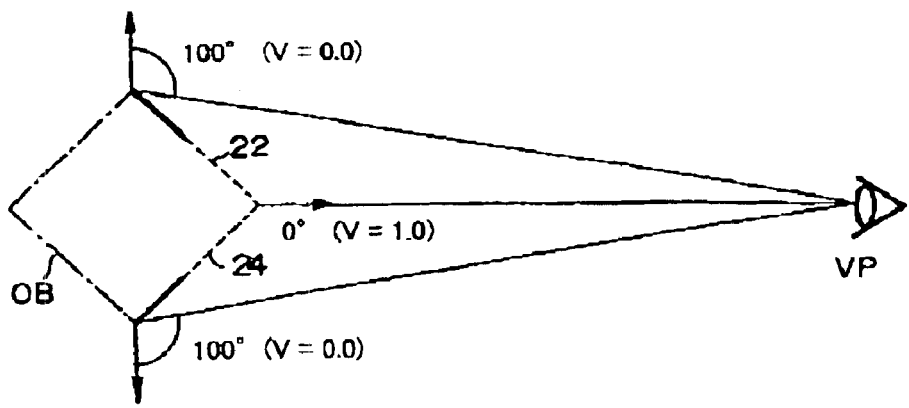

On the other hand, the outline image of the face 24 is abruptly thicken from FIG. 12A toward FIG. 12B and has its maximum thickness in FIG. 12B, as viewed from the viewpoint VP. The outline image is gradually thinned from FIG. 12B toward FIG. 13B and will be invisible in FIG. 13B.

In FIG. 12B, the outline image of the face 24 is thicken. In FIG. 13A, the outline image of the face 22 is thicken. This is because the angles of the faces 24 and 22 in FIGS. 12B and 13A change gently in the vicinity of the outline point (or with the angle θ between the first vector and the normal vector changing from 90 degrees with a lower decrement), as shown by A1 in FIG. 2.

Figure 13B:
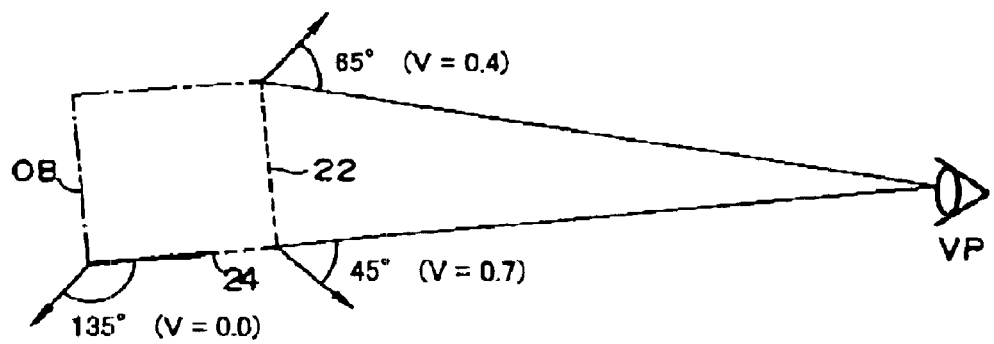

In FIG. 12A, the outline image of the face 24 is thinned (or invisible). In FIG. 13B, the outline image of the face 22 thinned (or invisible). This is because the angles of the faces 24 and 22 in FIGS. 12A and 13B change abruptly in the vicinity of the outline point (or with the angle θ between the first vector and the normal vector changing from 90 degrees with a higher decrement), as shown by A2 in FIG. 2.

As will be apparent from FIGS. 12A to 13B, if an object is formed by roughly divided polygons, the outline image will be thinned into a thickness less than one pixel or will not initially be drawn, depending on the direction in which the object is viewed. This will generate an unnatural image.

Figure 3:
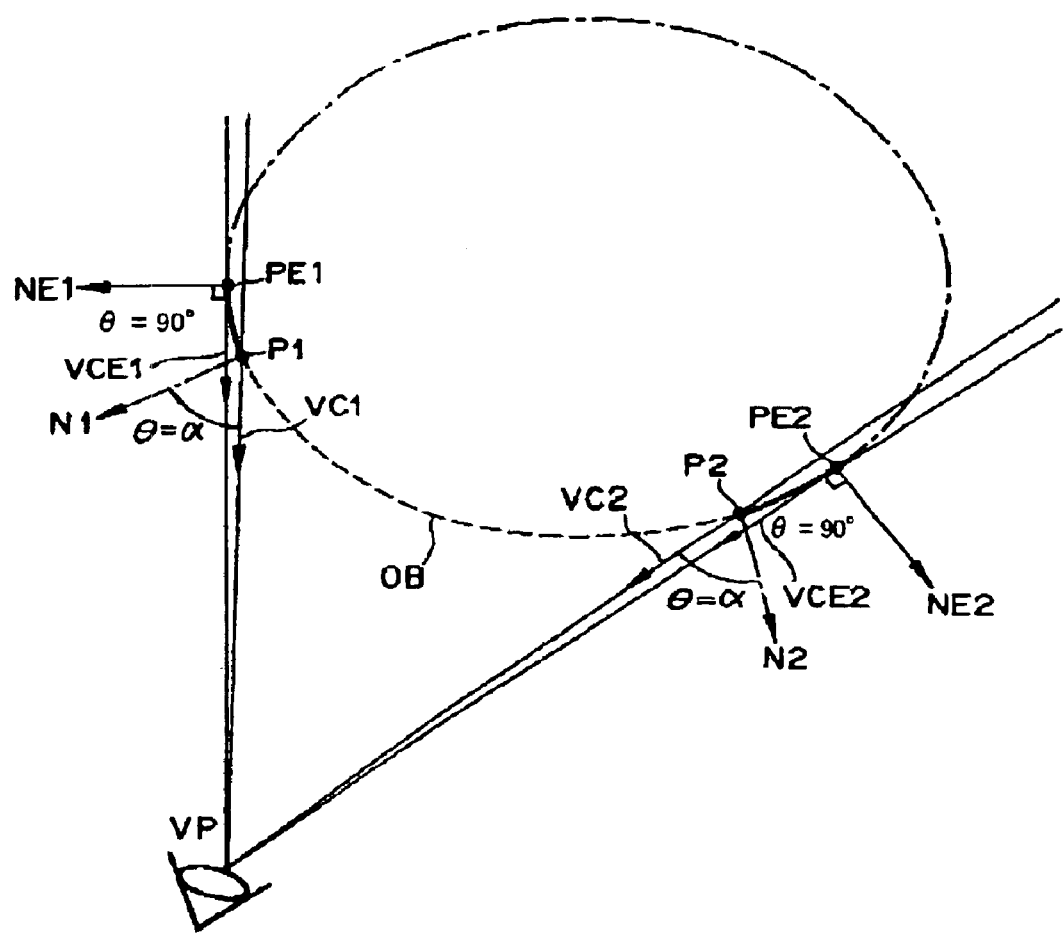
FIG. 3 illustrates a technique of changing the thickness of the outline image depending on an angle θ between a first vector and a normal vector.

To ensure that the outline image is continuously drawn without breaking all the outline of the object, this embodiment is intended to draw a further outline image having its constant thickness in addition to the outline images having their variable thickness as described in FIGS. 2 and 3.

In such a manner, the outline image of the object can have a thickness equal in minimum to one pixel. Thus, such a situation that the unnatural image will be generated can be avoided.

The technique of generating the outline image having its constant thickness can be accomplished by any of various possible processings.

For example, there may be a first possible technique in which a boundary line between front-facing and back-facing polygons is specified, the outline image being then drawn on that boundary line.

Figure 14A:
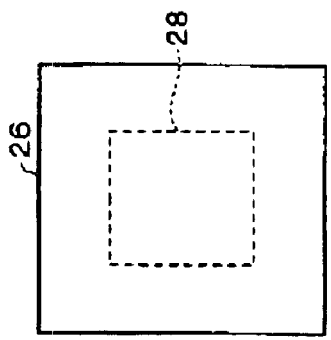
FIGS. 14A to 14F illustrate a technique of drawing the outline image with a constant thickness.
Figure 14B:
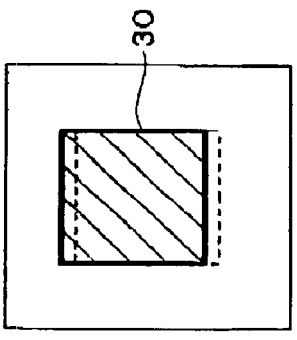
Figure 14C:
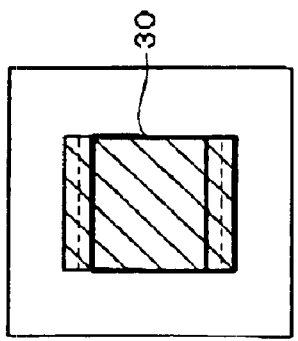
Figure 14D:
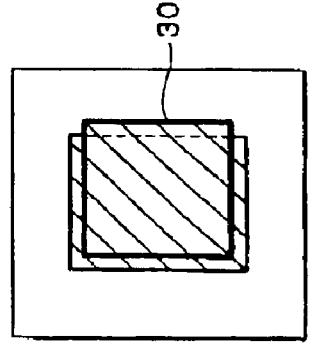
Figure 14E:
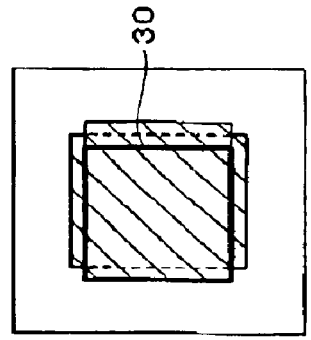
Figure 14F:
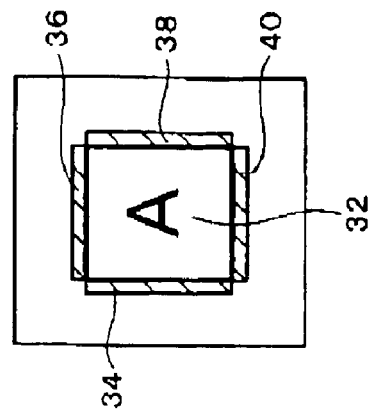

In a second possible technique, mask images 30 filled with the color of the outline are drawn in an area 28 in which the original image of such a geometry-processes (or perspective-transformed) object as shown in FIG. 14A is to be drawn (or an area on the frame buffer 26), with the mask images 30 being deviated from the area 28 in the directions of up-down and right-left by several pixels (micro-value), as shown in FIGS. 14B, 14C, 14D and 14E.

Finally, the original image 32 of the object is drawn in the area 28, as shown in FIG. 14P. In such a manner, outline images 34, 36, 38 and 40 having their constant thickness will be drawn in the vicinity of the outline of the original object image 32.

If the outline images having their constant thickness are to be drawn by the use of the first technique in which the outline image is drawn on the boundary line between the front-facing and back-facing polygons, it is desired that the outline images are prevented from being redundantly drawn.

In this embodiment, the following technique is added to the first technique.

If a polygon to be processed is front-facing, the outline image thereof is drawn between adjacent vertexes at which back-facing normal vectors are set. On the other hand, if a polygon to be processed is back-facing, the outline image thereof is drawn between adjacent vertexes at which front-facing normal vectors are set.

Figure 15A:
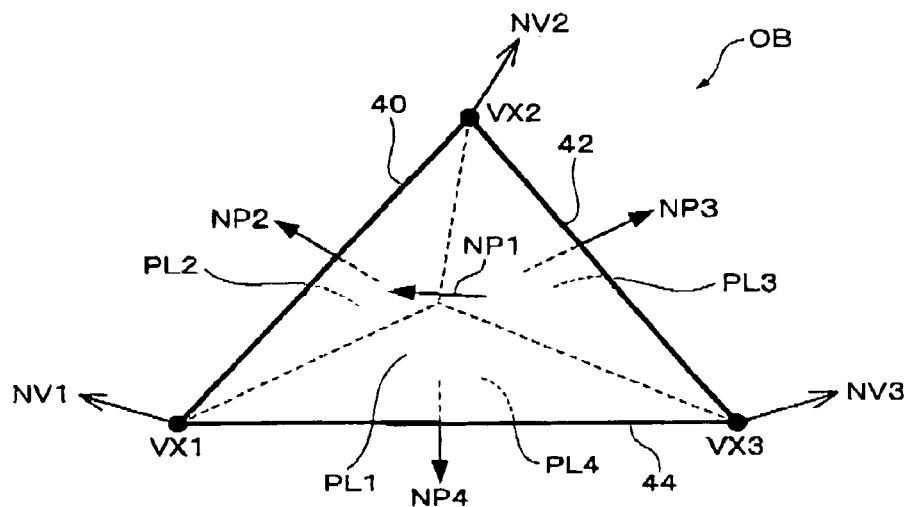
FIGS. 15A, 15B and 15C illustrate a technique of drawing the outline image with a constant thickness after it has been judged whether the polygon and normal vector at vertex are front-facing or back-facing.

For example, FIG. 15A shows an object OB formed by polygons PL1, PL2, PL3 and PL4.

In FIG. 15A, normal vectors indicating the orientations of the faces of the polygons PL1, PL2, PL3 and PL4 are NP1, NP2, NP3 and NP4.

Normal vectors NV1, NV2 and NV3 have previously been set at vertexes VX1, VX2 and VX3, respectively.

Figure 15B:
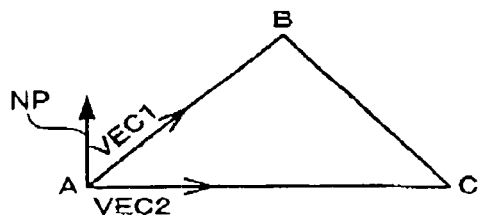

As shown in FIG. 15B, the normal vector NP (NP1, NP2, NP) or NP4) relative to the face can be determined by determining a vector VEC1 extending from vertex A toward vertex B in the polygon PL and another vector VEC2 extending from the vertex A toward vertex C and taking the outer product between these vectors VEC 1 and VEC2.

Figure 15C:
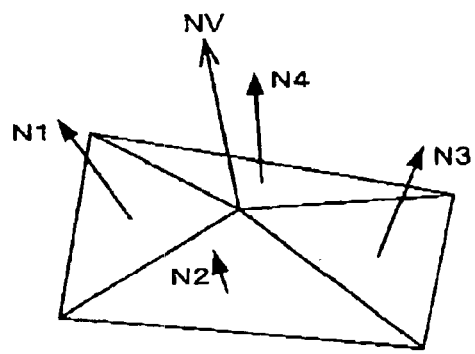

As shown in FIG. 15C, the normal vector NV (NV1, NV2 or NV3) set at the vertex VX is one that is obtained by blending normal vectors N1, N2, N3 and N4 together, which vectors share the vertex VX.

In this embodiment, it is first judged, for example, whether the polygon PL1 is front-facing or back-facing as viewed from the viewpoint. Such a judgment can be carried out by checking the orientation of the normal vector NP1 of the face of the polygon PL1 which is obtained through the technique shown in FIG. 15B (or by calculating the inner product).

If it is judged that the polygon PL1 is front-facing, it is then judged whether the normal vectors NV1, NV2 and NV 3 set respectively at the vertexes VX1, VX2 and VX3 of the polygon PL1 are front-facing or back-facing as viewed from the viewpoint.

If it is judged, for example, that both the normal vectors NV1 and NV2 at the vertexes VX1 and VX2 are back-facing, it is recognized that the adjacent polygon PL2 sharing these vertexes is back-facing and that the boundary line between the polygons PL1 and PL2 is an outline. In such a case, therefore, an outline image 40 having its constant thickness is drawn between the adjacent vertexes VX1 and VX2.

Similarly, if it is judged that both the normal vectors NV2 and NV3 for the respective vertexes VX2 and VX3 are back-facing, an outline 42 is drawn between VX2 and VX3. If it is judged that both the normal vectors NV3 and NV1 for the respective vertexes VX3 and VX1 are back-facing, an outline 44 is drawn between VX3 and VX1.

On the contrary, if it is judged that the polygon PL1 is back-facing, the corresponding outline image will be drawn between the adjacent vertexes on condition that each of the normal vector pairs (NV1 and NV2; NV2 and NV3; and NV3 and NV1) set at each pair of the adjacent vertexes (VX1 and VX2; VX2 and VX3; and VX3 and VX1) is judged to be front-facing.

Such a technique can prevent the outline images from being redundantly drawn. Thus, the outline images having their constant thickness can be drawn with increased speed.

3. Process of this Embodiment

Figure 16:
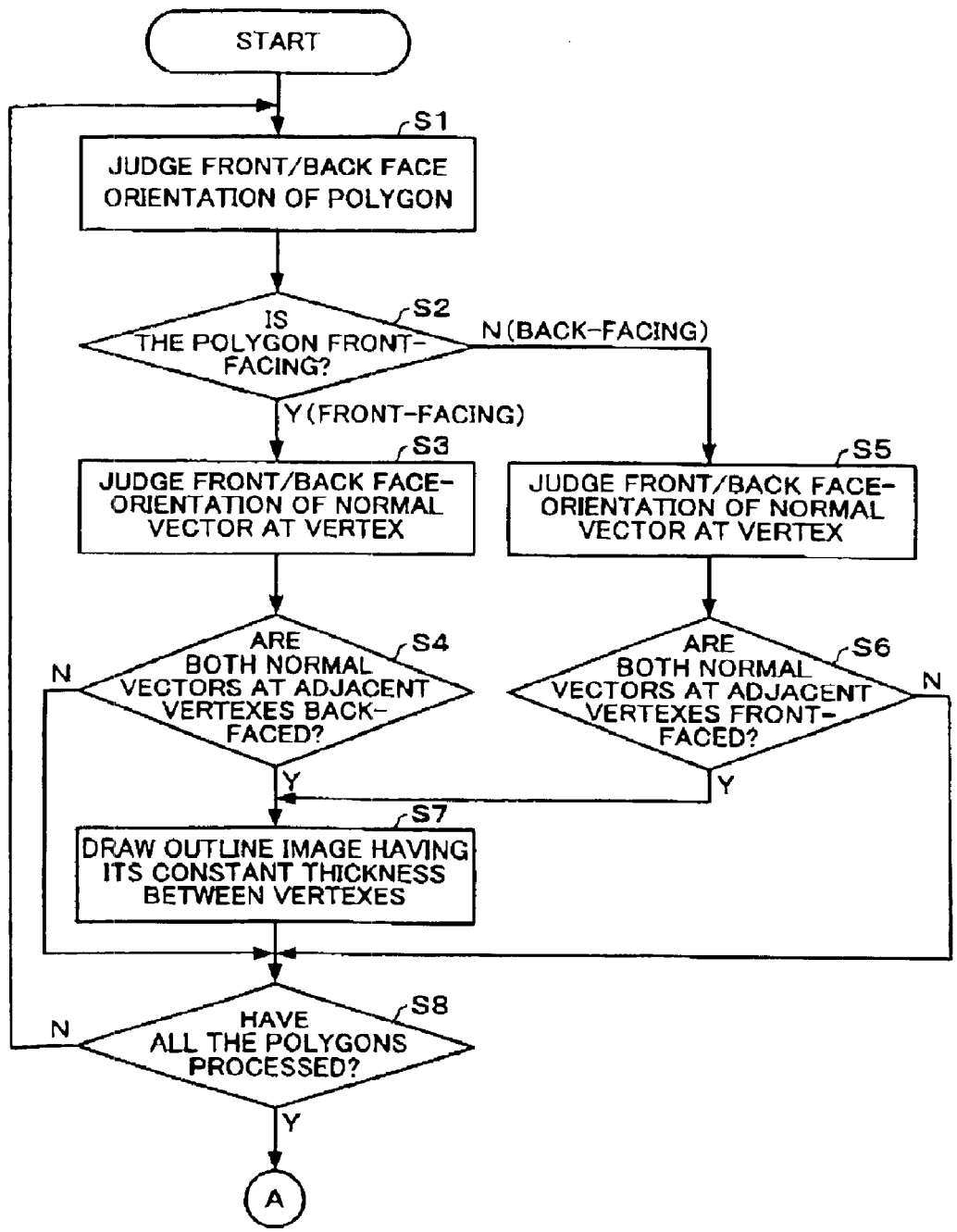
FIG. 16 is a flowchart illustrating the detailed process according to this embodiment.
Figure 17:
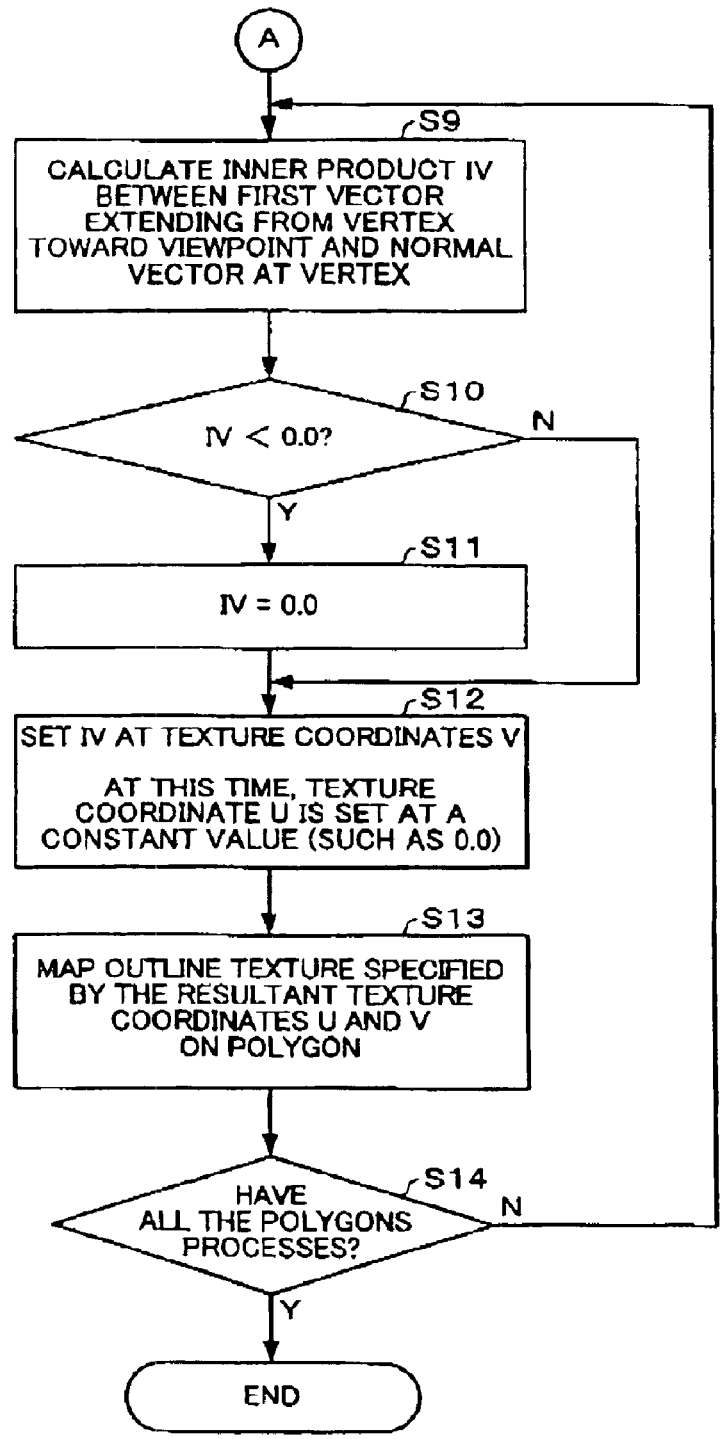
FIG. 17 is a flowchart following the flowchart of FIG. 16.

The details of the process according to this embodiment will be described in connection with the flowcharts shown in FIGS. 16 and 17.

First of all, it is judged whether a polygon to be processed is front-facing or back-facing (step S1). Such a judgment can be carried out by checking whether or not a normal vector relative to a face of the polygon obtained through the technique of FIG. 15B is front-facing.

If it is judged that the polygon is front-facing, it is then judged whether a normal vector set at each of the vertexes in that polygon is front-facing or back-facing (steps S2 and S3). If it is judged that normal vectors at a pair of adjacent vertexes is back-facing, an outline having its constant thickness is drawn between these vertexes (steps S4 and S7).

On the other hand, if it is judged that the polygon is back-facing at the step S2, an outline having its constant thickness is drawn between adjacent vertexes on condition that the normal vectors at adjacent vertexes are judged to be front-facing (steps S5, S6 and S7).

The aforementioned procedure is repeated until all the polygons have been processed (step S8).

As described in connection with FIG. 5, the inner product IV between a first vector extending from a vertex toward the viewpoint and a normal vector is then calculated (step 99). It is then judged whether or not the inner product IV is smaller than 0.0. If do so, the inner product IV is clamped at 0.0 (steps S10 and S11).

The value of the inner product IV is then set at texture coordinates V. At this time, texture coordinates U is set at a constant value (e.g., 0.0) (step s12). An outline texture specified by the resultant texture coordinates U and V is read out (see FIGS. 6, 8A and 8B) This outline texture is then mapped on the polygons forming the object (step 813).

The above-mentioned procedure is repeated until all the polygons have been processed (step S14).

In such a manner, the outline image having variable thickness depending on the direction in which the object is viewed and constant thickness will be drawn.

4. Hardware Arrangement

Figure 18:
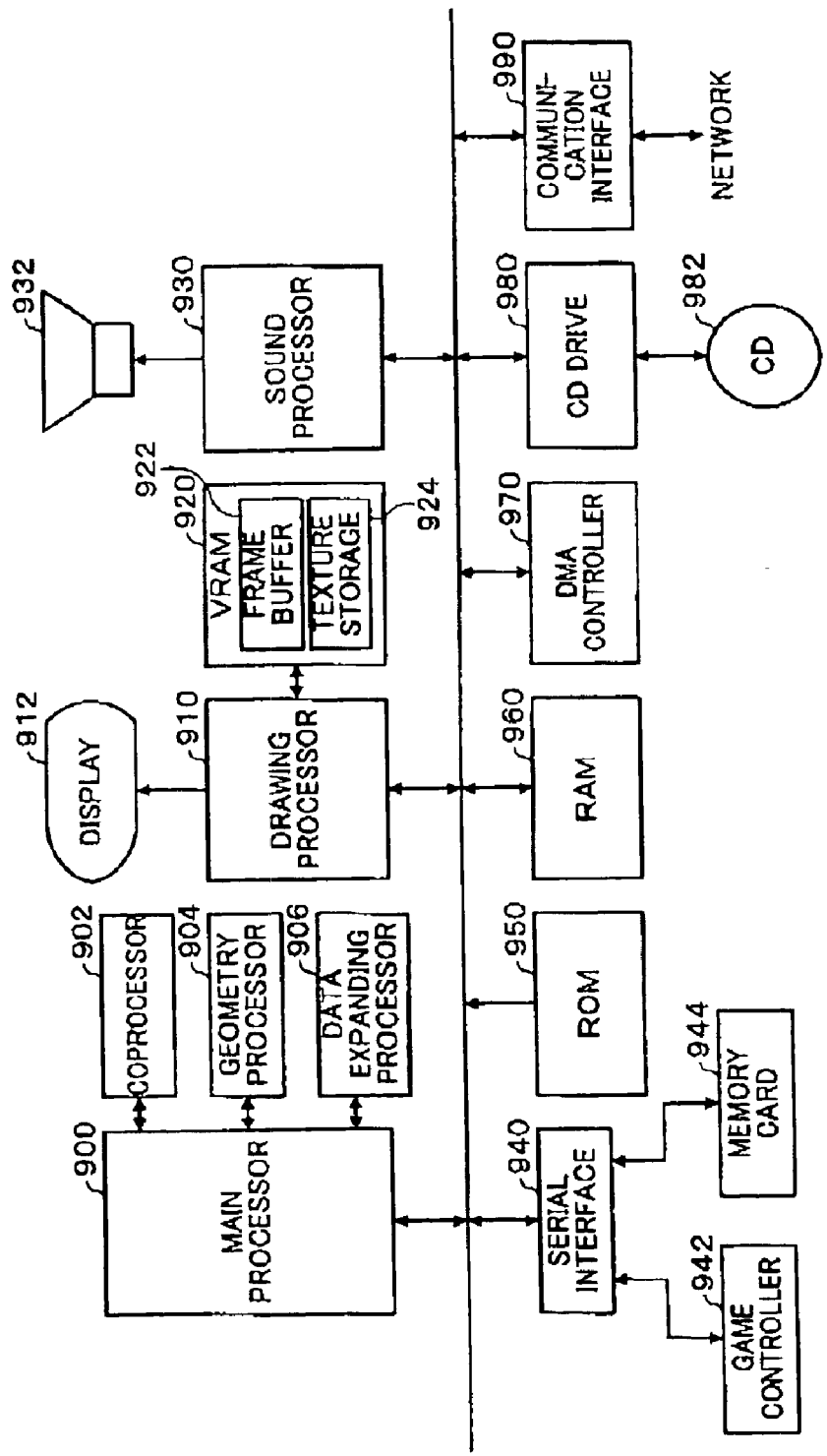
FIG. 18 is a block diagram of a hardware configuration which can realize this embodiment.

A hardware arrangement which can realize this embodiment is shown in FIG. 18.

A main processor 900 operates to execute various processings such as game processing, image processing, sound processing and other processings according to a program stored in a CD (information storage medium) 982, a program transferred through a Communication interface 990 or a program stored in a ROM (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding processing for expanding image and sound compressed data or a processing for accelerating the decoding processing in the main processor 900. In the opening, intermission, ending or game scene, thus, an animation compressed in a given image compression mode may be displayed. The image and sound data to be decoded may be stored in the storage devices including ROM 950 and CD 982 or may externally be transferred through the communication interface 990.

A drawing processor 910 is to draw or render an object constructed by primitive surfaces such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform alpha (α) blending (or translucency processing), depth-queing, mip-mapping, fogging, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BDMs sound effects and voices. The generated game sounds are outputted from a speaker 932.

The operational data from a game controller 942, saved data from a memory card 944 and personal data may externally be transferred through a serial interface 940.

ROM 950 has stored a system program and soon. For an arcade game system, the ROM 950 functions as an information storage medium in which various programs have been stored. The ROM 950 may be replaced by any suitable hard disk.

RAM 960 is used as a working area for various processors.

DMA controller 970 controls DMA transfer between a processor and a memory (such as RAM, VRAM, and ROM)

The DMA controller 980 drives a CD (information storage medium) 982 in which the programs, image data or sound data have been stored and enables these programs and data to be accessed.

The communication interface 990 is to perform data transfer between the image generating system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the game system and any one of the other game systems.

All the means of the present invention may be realized (or executed) only through hardware or only through a program which has been stored in an information storage medium or which is distributed through the communication interface. Alternatively, they may he executed both through the hardware and program.

If all the means of the present invention are executed both through the hardware and program, the information storage medium will have stored a program for executing the means of the present invention through the hardware. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the means of the present invention based on the instruction and delivered data.

Figure 19A:
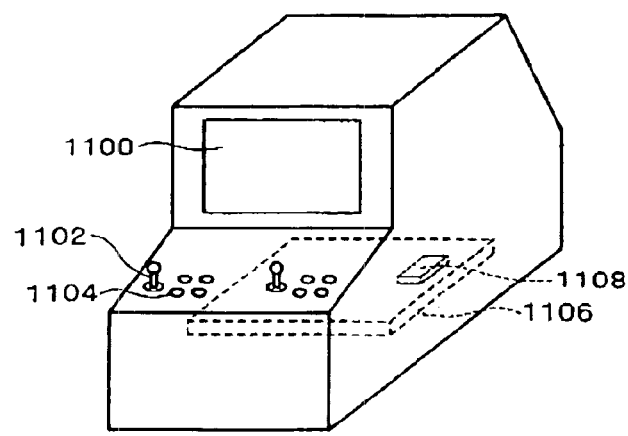
FIGS. 19A, 19B and 19C show several system forms to which this embodiment can be applied.

FIG. 19A shows an arcade game system to which this embodiment is applied. Players enjoy a game by controlling levers 1102 and buttons 1104 while viewing a game scene displayed on a display 1100. A system board (circuit board) 1106 included in the game system includes various processor and memories which are mounted thereon. Information (a program or data) for realizing all the means of the present invention has been stored in a memory 1108 on the system board 1106, which is an information storage medium. Such information will be referred to "stored information" later.

Figure 19B:
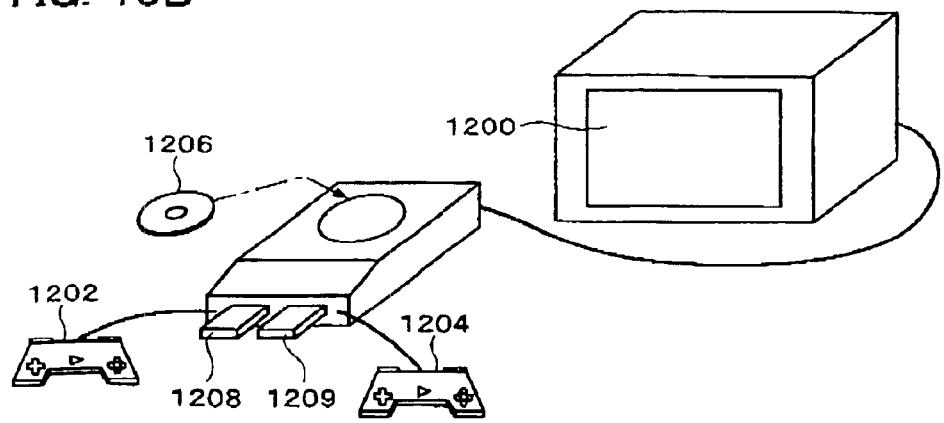

FIG. 19B shows a home game apparatus to which this embodiment is applied. A player enjoys a game by manipulating game controllers 1202 and 1204 while viewing a game picture displayed on a display 1200. In such a case, the aforementioned stored information pieces have been stored in DVD 1206 and memory cards 1208, 1209 which are detachable information storage media in the game system body.

Figure 19C:
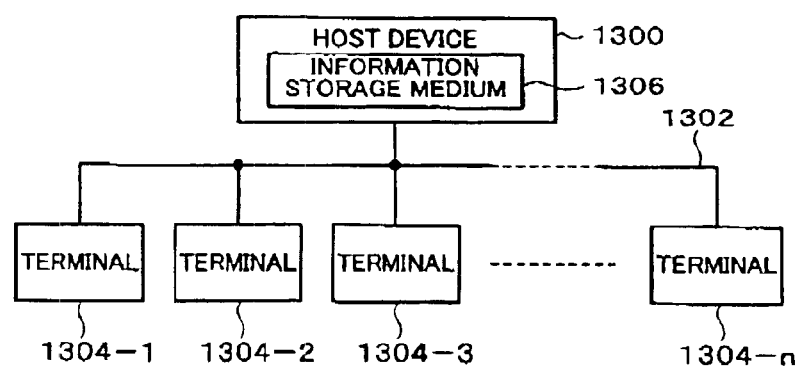

FIG. 19C shows an example wherein this embodiment is applied to a game system which includes a host device 1300 and terminals 1304-1 to 1304-*n* connected to the host device 1300 through a network (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host device 1300, for example. If each of the terminals 1304-1 to 1304-*n* are designed to generate game images and game sounds in a stand-alone manner, the host device 1300 delivers the game program and other data for generating game images and game sounds to the terminals 1304-1 to 1304-*n*. On the other hand, if the game images and sounds cannot be generated by the terminals in the stand-alone manner, the host device 1300 will generate the game images and sounds which are in turn transmitted to the terminals 1304-1 to 1304-*n*.

In the arrangement of FIG. 19C, the means of the present invention may be decentralized into the host device (or server) and terminals. The above information pieces for realizing the respective means of the present invention may be distributed and stored into the information storage media of the host device (or server) and terminals.

Each of the terminals connected to the network may be either of home or arcade type. When the arcade game systems are connected to the network, it is desirable that each of the arcade game systems includes a portable type information storage device (memory card or portable game machine) which can not only transmit the information between the arcade game systems but also transmit the information between the arcade same systems and the home game systems.

The present invention is not limited to the things described in connection with the above forms, but may be carried out in any of various other forms.

For example, the invention relating to one of the dependent claims may not contain part of the structural requirements in any claim to which the one dependent claim belongs. The primary part of the invention defined by one of the independent claim may belong to any other independent claim.

The invention for changing the thickness of the outline image depending on the face shape of the object in the vicinity of the outline thereof may be realized through such a technique of changing the thickness of the outline image depending on the angle θ as shown in FIG. 3 or through such a technique of mapping the outline texture specified by the texture coordinates corresponding to the angle θ as shown in FIG. 5. Alternatively, the invention may be realized by any of the other equivalent techniques.

Although this embodiment has been described as to the object formed by the polygons, the present invention may be applied to a case where an object is formed by primitive surfaces having the other forms, such as free-form curved surfaces or the like.

The present invention may also be applied to a case where vectors mathematically equivalent to the first vector and the normal vector described in connection with this embodiment (or vectors for specifying an outline) are used.

The patterns of the outline textures are not limited to those described in connection with FIGS. 6, 8A and 8B.

The technique of drawing the outline image having its constant thickness is also not limited to those described in connection with FIGS. 14A to 14F and 15A to 15C, but may be carried out in any of various other forms.

The present invention may similarly be applied to any of various other games such as fighting games, shooting games, robot combat games, sports games, competitive games, roll-playing games, music playing games, dancing games and so on.

Furthermore, the present invention can be applied to various image generating systems such as arcade game systems, home game systems, large-scaled multi-player attraction systems, simulators, multimedia terminals, various game systems (or image generating systems) such as system boards for generating game images.

What is claimed is:

1. A game system which generates an image, comprising:
   a memory which stores a program and data for image generation; and
   at least one processor which is connected to the memory and performs processing for image generation,
   the processor including:
   a determining section which determines a texture coordinate used to specify an outline texture based on a first vector extending from a point on an object face toward a viewpoint and a normal vector indicating an orientation of the object face;
   a mapping section which maps an outline texture specified by the determined texture coordinate on the object; and
   an image generating section which generates an image viewed from the viewpoint within an object space in which the object is positioned.

2. The game system according to claim 1,
   wherein the texture coordinate used to specify the outline texture is determined from an inner product between a first vector extending from a vertex of the object toward the viewpoint and a normal vector set at the vertex of the object.

3. The game system according to claim 1,
   wherein the outline texture has a first texture pattern for representing the outline image and a second texture pattern different from the first texture pattern, and
   wherein the first texture pattern is specified when the texture coordinate is between a first value and a second value, and the second texture pattern is specified when the texture coordinate is between the second value and a third value.

4. The game system according to claim 1, further comprising a second outline drawing section which draws another outline image having a constant thickness.

5. A computer-usable program embodied on an information storage medium or in a carrier wave, comprising a processing routine for a computer to realize:
   a determining section which determines a texture coordinate used to specify an outline texture based on a first vector extending from a point on an object face toward a viewpoint and a normal vector indicating an orientation of an object face;
   a mapping section which maps an outline texture specified by the determined texture coordinate on the object; and
   an image generating section which generates an image viewed from the viewpoint within an object space in which the object is positioned.

6. The program according to claim 5,
   wherein the texture coordinate used to specify the outline texture is determined from an inner product between a first vector extending from a vertex of the object toward the viewpoint and a normal vector set at the vertex of the object.

7. The program according to claim 5,
   wherein the outline texture has a first texture pattern for representing the outline image and a second texture pattern different from the first texture pattern, and wherein the first texture pattern is specified when the texture coordinate is between a first value and a second value, and the second texture pattern is specified when the texture coordinate is between the second value and a third value.

8. The game system according to claim 5, further comprising a processing routine for a computer to realize a second drawing section which draws another outline image having a constant thickness.

9. A method for generating an image, comprising:

determining a texture coordinate used to specify an outline texture based on a first vector extending from a point on an object face toward a viewpoint and a normal vector indicating an orientation of an object face;

mapping an outline texture specified by the determined texture coordinate on the object; and generating an image viewed from the viewpoint within an object space in which the object is positioned.

10. The method according to claim 9, wherein the texture coordinate used to specify the outline texture is determined from an inner product between a first vector extending from a vertex of the object toward the viewpoint and a normal vector set at the vertex of the object.

11. The method according to claim 9, wherein the outline texture has a first texture pattern for representing the outline image and a second texture pattern different from the first texture pattern, and wherein the first texture pattern is specified when the texture coordinate is between a first value and a second value, and the second texture pattern is specified when the texture coordinate is between the second value and a third value.

12. The method according to claim 9, further comprising drawing another outline image having a constant thickness.

* * * * *